ALFRED F. STAHLER
INVENTOR.

BY Robert G. Clay

ATTORNEY

ALFRED F. STAHLER
INVENTOR.

BY Robert H. Clay

ATTORNEY

FLUID LUBRICATED MAGNETIC TAPE TRANSDUCER

Filed March 26, 1965 13 Sheets-Sheet 3

ALFRED F. STAHLER
INVENTOR.

BY Robert G. Clay

ATTORNEY

FLUID LUBRICATED MAGNETIC TAPE TRANSDUCER

Filed March 26, 1965

13 Sheets-Sheet 4

ALFRED F. STAHLER
INVENTOR.

BY Robert S. Clay

ATTORNEY

FLUID LUBRICATED MAGNETIC TAPE TRANSDUCER

Filed March 26, 1965 13 Sheets-Sheet 5

ALFRED F. STAHLER
INVENTOR.

BY Robert G. Clay
ATTORNEY

ALFRED F. STAHLER
INVENTOR.

BY Robert G. Clay

ATTORNEY

ALFRED F. STAHLER
INVENTOR.
BY Robert G. Clay
ATTORNEY

ALFRED F. STAHLER
INVENTOR.

BY Robert G. Clay

ATTORNEY

ALFRED F STAHLER
INVENTOR

BY Robert G. Clay

ATTORNEY

FLUID LUBRICATED MAGNETIC TAPE TRANSDUCER

ALFRED F. STAHLER
INVENTOR.

BY Robert G. Clay

ATTORNEY

FLUID LUBRICATED MAGNETIC TAPE TRANSDUCER

ALFRED F. STAHLER
INVENTOR

BY Robert G. Clay

ATTORNEY

Dec. 10, 1968 A. F. STAHLER 3,416,149

FLUID LUBRICATED MAGNETIC TAPE TRANSDUCER

Filed March 26, 1965 13 Sheets-Sheet 12

ALFRED F. STAHLER
INVENTOR.

BY Robert G. Clay

ATTORNEY

ALFRED F. STAHLER
INVENTOR.

BY Robert H. Clay

ATTORNEY

United States Patent Office 3,416,149

Patented Dec. 10, 1968

3,416,149

FLUID LUBRICATED MAGNETIC TAPE TRANSDUCER

Alfred F. Stabler, San Jose, Calif., assignor to Ampex Corporation, Redwood City, Calif., a corporation of California Filed Mar. 26, 1965, Ser. No. 442,859
11 Claims. (Cl. 340—174.1)

ABSTRACT OF THE DISCLOSURE

An air bearing is provided for magnetic tape moving across a magnetic transducing head that has a curved bearing surface. Air is supplied to the bearing from a transverse recess in the bearing surface upstream from the magnetic head gap, the recess being coupled to a pressure source that is variable to adjust the head-to-tape spacing. The pressure in the recess is maintained at a value equal to or less than the pressure beneath the tape at the head gap, to provide stability in the bearing. Furthermore, the range of spacing over which the bearing remains stable is controlled by controlling the radius of curvature of the downstream edge of the recess.

This invention relates to fluid lubricated magnetic tape transducers and particularly to such transducers providing a fluid film of controllable thickness.

In the magnetic tape recording and reproducing art, it is usual to move a tensioned foil or tape across a magnetic transducer and in pressurized contact therewith to secure the smallest possible spacing between the transducer and the magnetic oxide coating of the tape, the strength of the recorded or reproduced signal being an inverse function of this spacing. However, such physical contact causes frictional wear of the expensive transducer surfaces, gradually changing their operating characteristics, which alone is undesirable, and eventually causing failure of the transducers, often within a few thousand hours of use. The friction also wears the tape oxide, causing increasing loss of information and eventual destruction.

To overcome this problem it has been proposed to lubricate the tape at the transducer head by means of self-acting air bearings such as have been previously used to reduce the wear of tape in passage over various guide posts of a transport. In such bearings, the moving tape itself drags air into the compresses it into a "film" in the region between the tape and the bearing post or transducer. The film thickness or spacing $h$ that results between the tape and transducer of course reduces the strength of the signal, but not to an intolerable degree. However, the spacing $h$ is a function of various transport and tape parameters, such as head radius of curvature, tape speed and tension, and the characteristics of the particular piece of tape being used. If one is limited to certain combinations of such parameters and characteristics for reasons that have nothing to do with the head bearing, then one has only a correspondingly limited freedom to establish the spacing $h$ at a desired value. Furthermore, flutter variations of tape tension and speed occur in all transports, and so long as the spacing $h$ is a function of these parameters, it must inherit their inaccuracies. All considerations, therefore, urge that the spacing $h$ be controllable independently of, or in a way that is not exclusively dependent on, tape tension and speed, and individual tape and head characteristics. This object is not attainable with the self-acting air bearing known in the art.

The air-bearing guide post art, previously mentioned, also includes "externally-pressurized" bearings in which sources of pressurized air are coupled to provide an air and pressure supply for the bearing region in addition to the air and pressure supply created by the "self-acting" effect. In principle, control of the external pressure source would provide the desired independent control of the tape-to-bearing spacing $h$. However, the guide post art was concerned only with the problem of providing air bearings in the broadest sense, and not with the problem of maintaining a minimum and stable spacing $h$ at a particular point such as a transducer head gap. For example, the guide post art teaches the use of porous metal surfaces for the emission of pressurized air, and jets of various types. But when such structure is to be applied to a head bearing, many questions arise. How is the pressure to be controlled or varied? It is to such problems as these that the present invention is addressed.

Accordingly, it is an object of the present invention to provide a gas bearing for lubricating a tape in passage across a transducing head.

It is a further object of this invention to provide, in such a bearing, means for varying the head-to-tape spacing while maintaining predetermined tape characteristics, speed and tension.

It is a further object to provide, in such a bearing, means for establishing and stably maintaining a head-to-tape spacing of a predetermined value despite changes in tape characteristics, speed and tension.

It is a further object of the invention to provide, in an externally pressurized bearing, means for varying the head-to-tape spacing while maintaining a predetermined supply pressure to the bearing.

It is a further object of the invention to reduce the effects of tape speed and tension changes on the head-to-tape spacing of an externally pressurized bearing, while maintaining a predetermined supply pressure to the bearing.

It is a further object of this invention to provide a bearing as above described and requiring a minimum number of structural features and manufacturing operations.

These and other objects are achieved in a bearing having a transverse groove opening in the bearing surface at a point upstream from the transducer head gap in relation to the direction of tape motion, and a pressure source coupled to the groove for controlling the flow of air beneath the tape at the groove. The shape of the groove and the value of the air pressure in the source control the thickness of the air film beneath the tape and the spacing of the tape from the head. Stability of this spacing is obtained when the pressure source is adjusted to a value at which the pressure in the groove is equal to or less than the pressure beneath the tape at the head.

A better understanding of the invention may be had by reference to the following description, taken in conjunction with the accompanying drawings, in which:

FIGURE 16 is a schematic view of a bearing constructed in accordance with the invention;

FIGURE 17 is a perspective of a bearing constructed in accordance with the invention;

Figure 1:
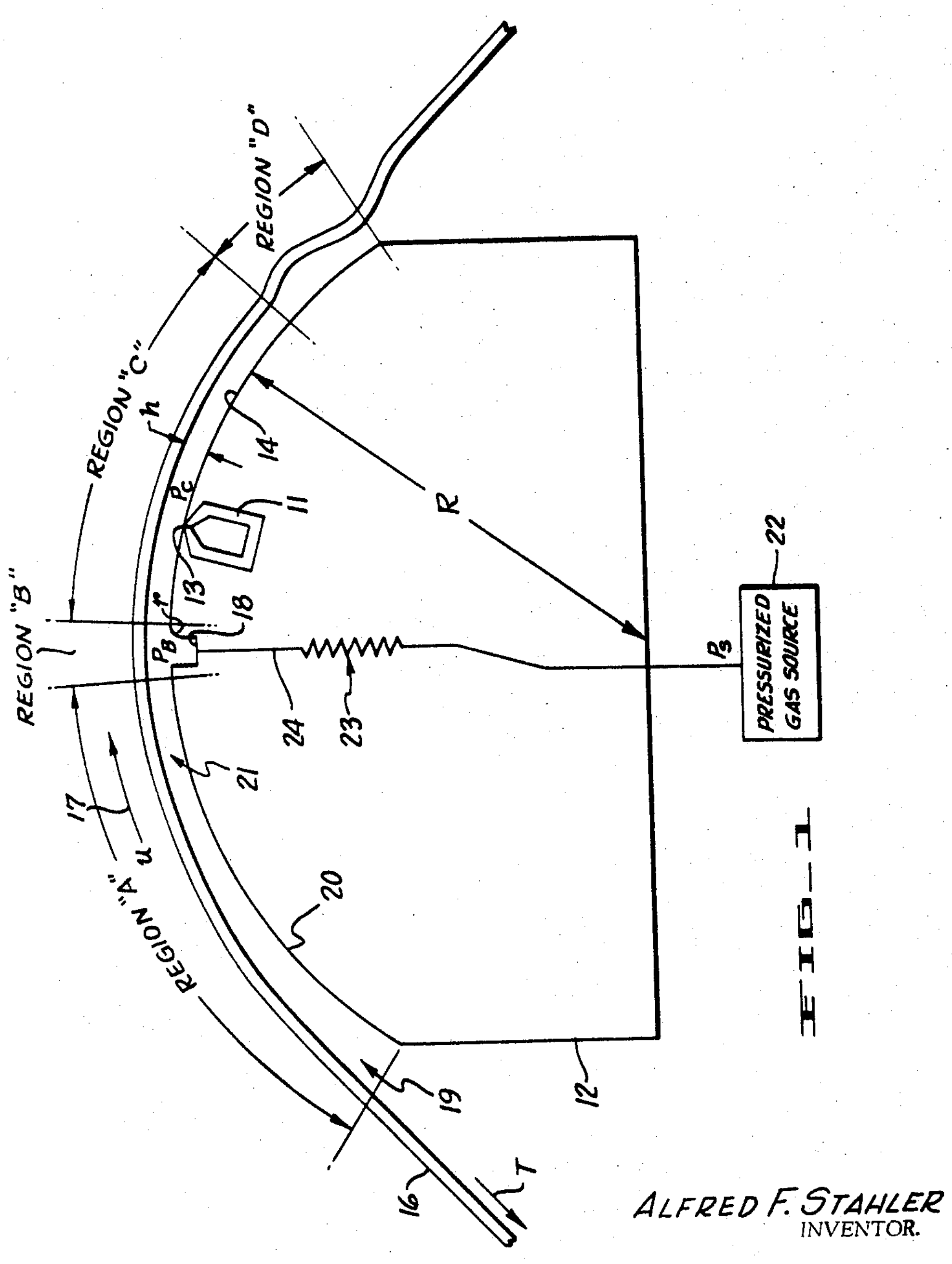
FIGURE 1 is a schematic view of a bearing in accordance with the invention.

Referring now to FIGURE 1, there is schematically shown a gas bearing structure in accordance with the present invention. A magnetic transducer 11 is mounted in a head block 12, with the head gap 13 lying on and facing outward from a salient curved bearing surface 14 of the block. The surface 14 has a radius R. A magnetic tape 16 in the form of a flexible or semiflexible foil is arranged to confront the surface 14 and is tensioned to generally conform thereto and is moved around the curve of the surface 14 in the direction indicated by arrow 17. The tension in the tape is indicated by arrows T and the velocity by the letter U. The tape tensioning and moving means are not shown in this figure, but may be any means known in the art, such as capstans, pinch rollers and braked or driven reels. Upstream from the head 11 (with relation to the direction of motion 17 of the tape) there is provided a control groove or recess 18 extending transversely to the direction of motion of the tape and having a length somewhat less than the width of the tape.

Before proceeding with further description of the structure shown in FIGURE 1, it will be of advantage to examine the basic operation of the elements thus far described. This structure when operating has certain well-defined regions A, B, C and D as shown, in which various effects take place. In region A a self-acting air bearing is established. The tape 16, approaching a point of tangency with the surface 14, frictionally entrains air from the surrounding atmosphere and compresses it in the narrowing, funnel-shaped entrance region 19 to form a bearing "film" of gas. Some variations takes place in the thickness of the film and of the spacing between the tape and surface 14 as the tape proceeds in a downstream direction and begins to conform to the curvature of the surface 14, as shown in region 20. However, eventually the air film becomes of constant pressure and thickness, and remains so as it moves downstream as shown in region 21, so long as the radius of curvature does not change. This constant thickness region is characteristic of self-acting foil bearings, and is established and maintained substantially despite lateral leakage of air from the edges of the tape, for the following reasons. Since the amount of entrained air is very small, the thickness of the air film is also quite small (e.g., 50 microinches) in relation to the dimensions of the tape segment that is supported by the air film and the block 12 (e.g., 1 inch wide by 2 inches long), so that in effect the volume of space between the tape and block 12 constitutes a restricted passage for the air. If the apparatus is viewed in cross-section (i.e., transverse to the direction of motion), it will be seen that the tape and block 12 define a restricted passage having a length (1 inch) on the order of 20,000 times the height (50 microinches). The impedance of this passage to lateral flow and leakage of the air is so great that such lateral leakage as there may be has substantially no effect in reducing the film thickness over most of the width of the tape, and substantially all of the pressurized air flows on through regions B and C and out of the bearing in the diverging exit region D where the tape becomes unstable. If it were not for the presence of the groove 18 in the present example, the region 21 of constant film thickness would extend through regions B and C. However, in the present structure the groove 18 constitutes a discontinuity in the surface 14 that alters the flow of the air in region B, and in effect establishes the beginning of a secondary self-acting bearing, resulting in a second region C of constant film thickness $h$. As further described hereinafter, the dimensions and shape of the groove 18 may be varied to assist in controlling the film thickness $h$ in region C, where the transducer 11 is located. However such control is best exercised as part of the manufacturing process, and further means are needed for altering the flow of air at the groove 18 to control the downstream film thickness $h$ during actual operation of the apparatus.

This further means is shown in FIGURE 1 as including a pressurized gas source 22 coupled through a restrictor 23 and a passage 24 to the bottom of the groove 18. The source 22 may be adjustable to supply any predetermined pressure $P_S$ to the restrictor 23 and this pressure may be established at such a value that the pressure $P_B$ in the groove is either greater or less than the pressure $P_C=T/R$ under the tape in region C. As disclosed in concurrently-filed U.S. patent application No. 442,860 entitled "Fluid Lubricated Magnetic Tape Transducer" by Joseph T. Ma and Roy T. Nakai, if $P_S$ is greater than $P_B$ and $P_B$ is greater than $P_C$, there is flow of air from the source 22 into the groove 18, increasing the quantity of air flowing into region C and increasing the film thickness $h$ downstream from the groove. Under these circumstances the film thickness $h$ in region C may become somewhat unstable. However, in the present invention, an extremely stable value of $h$ is obtained by setting the pressure $P_S$ low enough to cause a flow of air out of the groove 18 and toward the source 22. In such an arrangement, the air flow into the groove from region A is divided, part being diverted toward the source 22 and part being carried on to region C. Since the quantity of air supplied to region C is thus reduced, the film thickness $h$ is correspondingly reduced, to a controllable degree dependent on the setting of pressure $P_S$.

It will be understood that diversion of some of the air out of the bearing by the source 22 is but one condition under which stability and control may be achieved, and that such stability and control may also be obtained under some circumstances by causing flow into the bearing from the pressure source. Furthermore stability is also achieved by establishing a condition of "no flow" of air between the groove and pressure source, in which case the pressure source 22, passage 24 and restrictor 23 may be eliminated and control of the film thickness is entirely a function of the shape of groove 18, as hereinafter described. In all cases, however, the essential condition for stability is the relationship established by the groove-pressure-source flow in the values of $P_B$ and $P_C$, i.e., the pressure in the groove and the pressure under the tape in region C downstream. So long as $P_B$ is equal to $P_C$ (i.e., no flow between groove and pressure source), or less than $P_C$ (e.g., flow from the groove to the pressure source), the value of $h$ in region C is stable; but when $P_B$ is greater than $P_C$, the value of $h$ in region C is to some degree unstable. This phenomenon, among others, is illustrated by the following figures.

Figure 3:
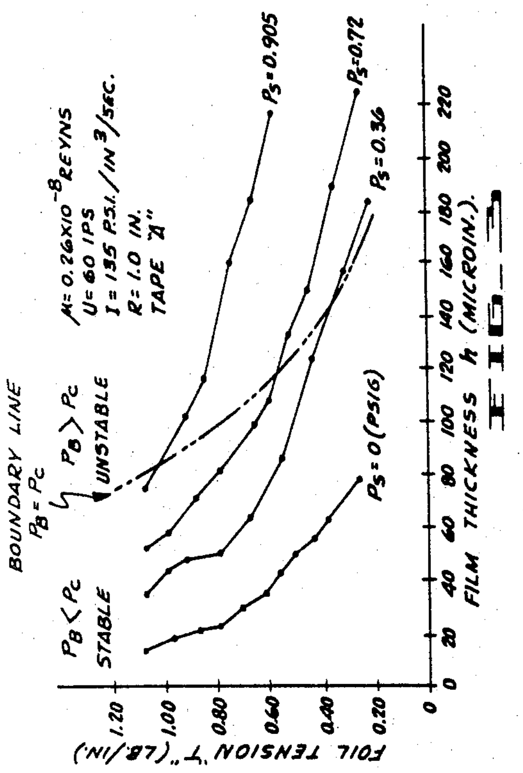
FIGURE 3 is a chart illustrating the operation of the invention.
Figure 4:
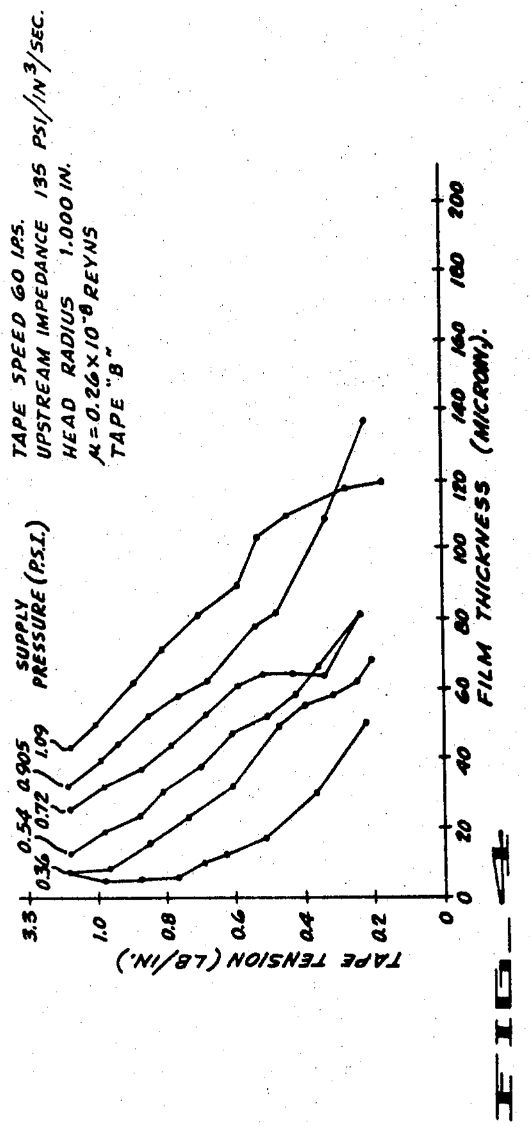
FIGURE 4 is a chart illustrating the operation of the invention.
Figure 2:
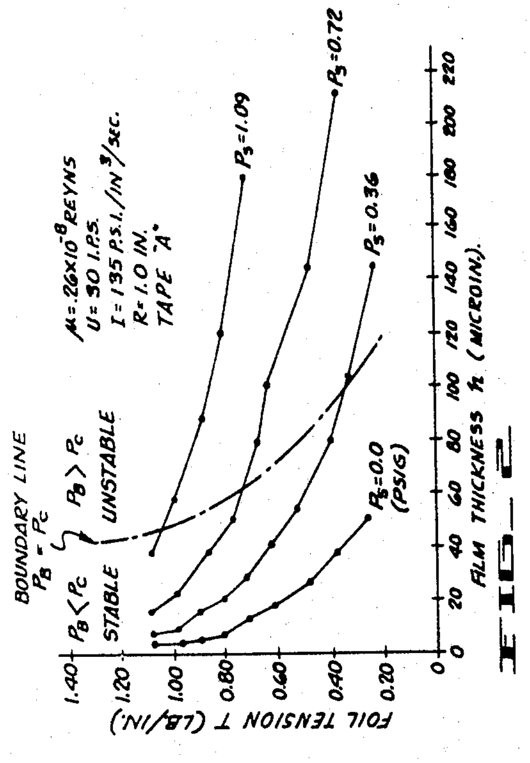
FIGURE 2 is a chart illustrating the operation of the invention.

FIGURES 2–4 illustrate the actual performance of an apparatus constructed and operated as above described. In FIGURES 2 and 3 the apparatus was operated at $U=30$ inches per second and $U=60$ i.p.s. respectively, using the same tape A. It is clear from these figures that the same film thickness $h$ may be obtained at both speeds merely by changing the source or reference pressure $P_S$. For example, with tape tension T established at 1.00 lb./in., a film thickness $h$ of 40 $\mu$in. can be obtained at $U=30$ i.p.s. with a source pressure $P_S$ of approximately 0.90 lb./in.$^2$ gauge, and at 60 i.p.s. with a $P_S$ of approximately 0.36 lb./in.$^2$ gauge. FIGURES 3 and 4 illustrate the same apparatus operated at 60 i.p.s. with tapes A and B made by different manufactures. It is clear that the same film thickness $h$ may be obtained with both tapes merely by changing the source pressure $P_S$. For example, with the same tension T of 1.00 lb./in. tape B may also be operated at the same 40 $\mu$in. film thickness with a source pressure $P_S$ of approximately 0.90 lb./in.$^2$ gauge.

Figure 6:
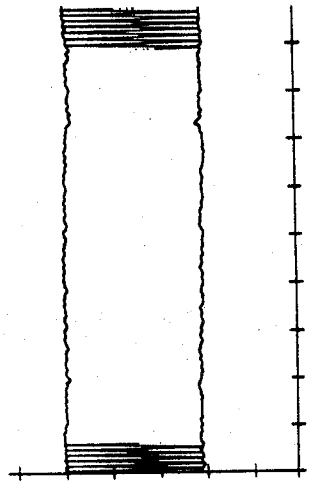
FIGURE 6 is a tracing of an oscilloscope display illustrating the operation of the invention.
Figure 5:
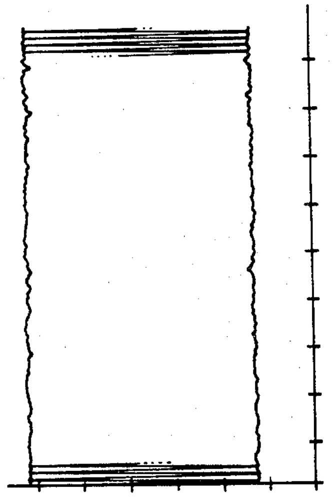
FIGURE 5 is a tracing of an oscilloscope display illustrating the operation of the invention.

FIGURES 5 and 6 are tracings of the envelopes of oscilloscope displays of a 50 kc. signal reproduced from a tape in contact with the head (FIGURE 5) and with a 50 $\mu$in. spacing or film thickness $h$ (FIGURE 6) produced by apparatus as above described. The amplitude of the signal with air spacing is less than when the tape is in contact, as would be expected. However, the envelopes in both figures are equally smooth, indicating that the air film bearing is equally as stable as the frictional bearing.

Figure 8:
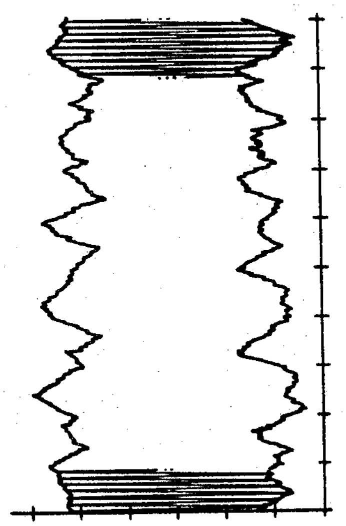
FIGURE 8 is a tracing of an oscilloscope display illustrating the operation of the invention.
Figure 7:
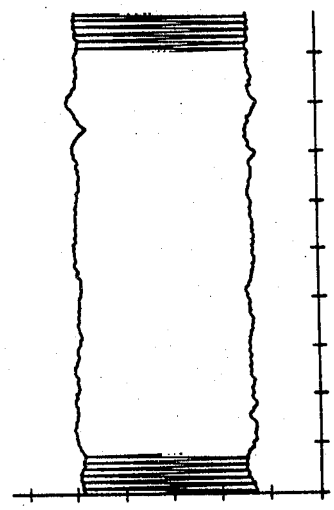
FIGURE 7 is a tracing of an oscilloscope display illustrating the operation of the invention.

In plotting FIGURES 2 and 3, values of $P_B$ and $P_C$ were also experimentally measured and lines representing the boundary $P_B=P_C$ are plotted. In the area to the left of the boundary line $P_B$ is everwhere less than $P_C$ and the film thickness $h$ is stable, as illustrated in FIGURE 7, which is a tracing similar to that of FIGURE 6 of an oscilloscope display of a 50 kc. signal reproduecd at 30 i.p.s. with the air bearing of the invention, and with $P_B$ less than $P_C$. In the area to the right of the boundary line $P_B=P_C$ (FIGURES 2 and 3), $P_B$ is everywhere greater than $P_C$, and the film thickness $h$ is unstable, as illustrated in FIGURE 8, which is a tracing of an oscilloscope display of the signal of FIGURE 7 when $P_B$ is greater than $P_C$.

While the control means shown in FIGURE 1 includes the groove 18, the pressure source 19, and the restrictor 21, the apparatus will operate satisfactorily with either the restrictor and groove alone, or the pressure source and groove alone, as disclosed in said concurrently-filed application by Joseph T. Ma, et al. Also, as previously mentioned, the shape of the groove itself has an influence on the value of $h$, independent of the pressure source, and this influence must be taken into account in order to obtain the most efficient results from the use of the pressure source, as follows.

Figure 9:
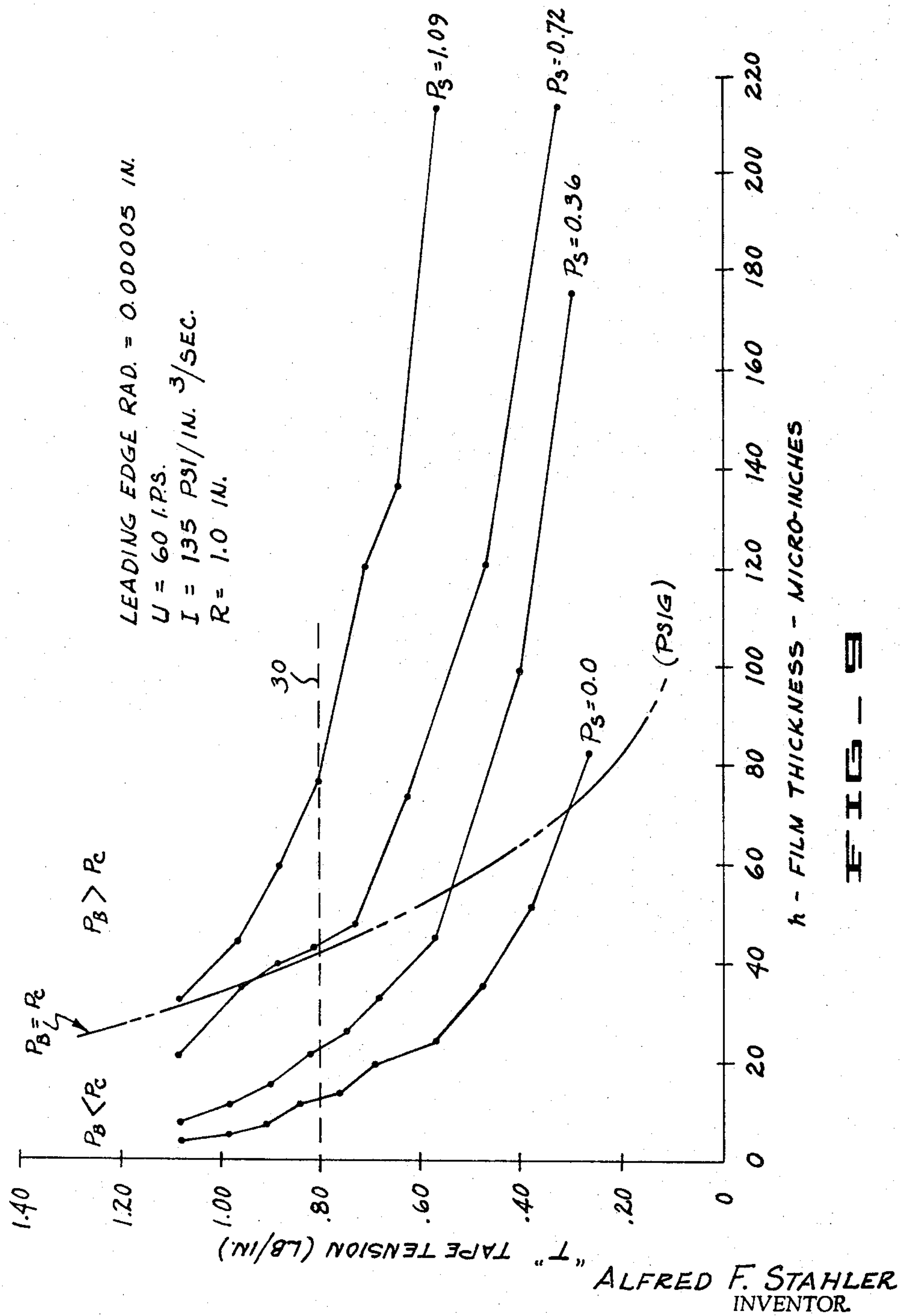
FIGURE 9 is a chart illustrating the operation of the invention.
Figure 10:
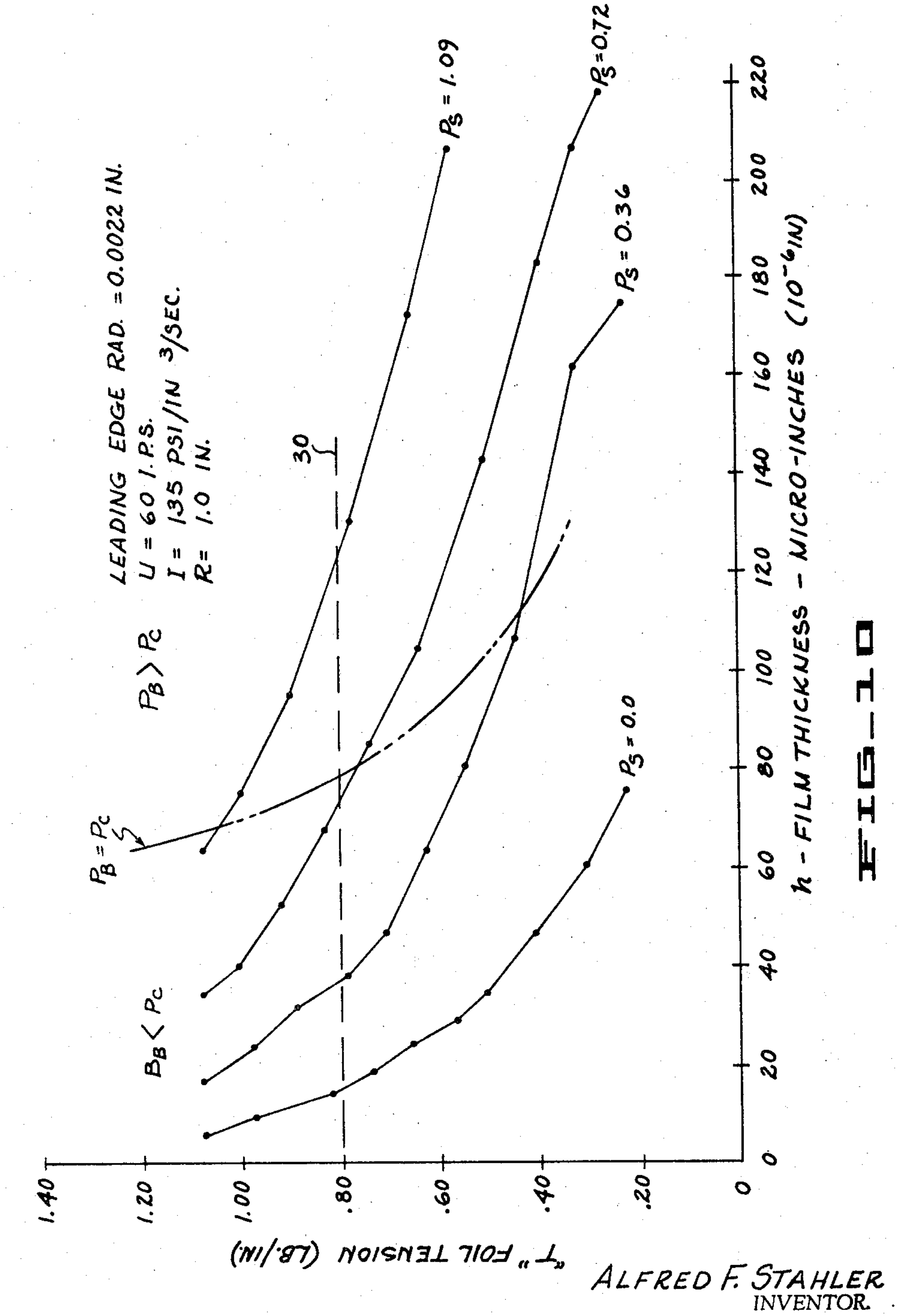
FIGURE 10 is a chart illustrating the operation of the invention.
Figure 11:
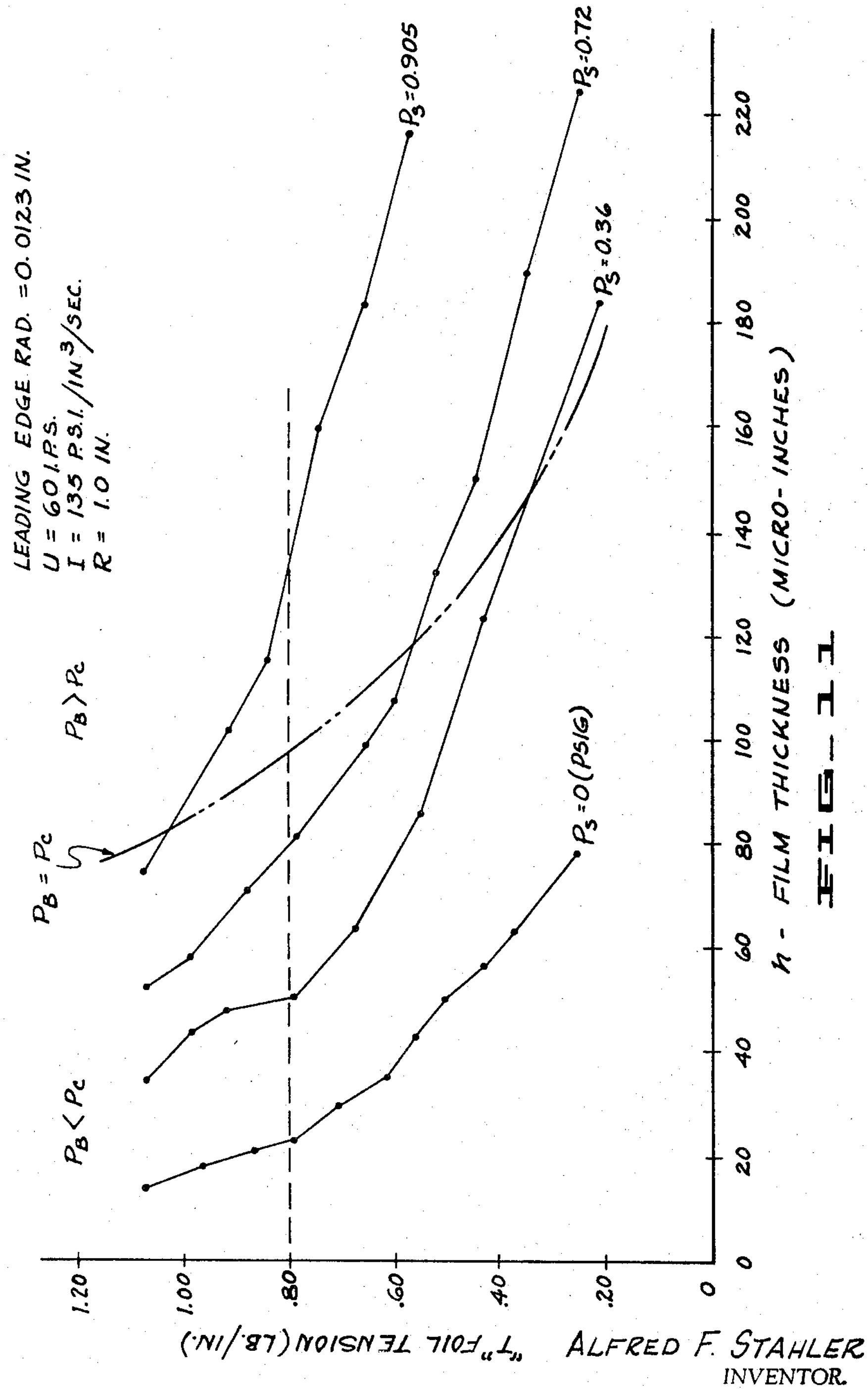
FIGURE 11 is a chart illustrating the operation of the invention.

FIGURES 9–11 illustrate the operation of the apparatus with a groove having a leading (downstream) edge radius of varying dimensions. In FIGURE 9, this edge radius $r$ is 0.00005 inch, substantially as produced when the groove is cut by high precision machine shop milling techniques. However, it will be seen that for any given tension T, the film thickness $h$ is comparatively small. For example, at $T=0.80$ lb./in., as illustrated by the dashed line 30, the value of $h$ when $P_B=P_C$ is only about 40 microinches. Consequently the range of stable $h$ that may be obtained in operation is correspondingly limited, i.e., 0–40 microinches. In FIGURE 10, the edge radius $r$ has been increased to 0.0022 inch, and the range of stable $h$ that may be obtained at $T$—0.80 lb./in. is increased to 0–80 microinches. In FIGURE 11, the edge radius $r$ has been increased again to a value of 0.0123 inch, and the range of stable $h$ that may be obtained at $T=0.80$ lb./in. has been increased to 0–100 microinches. Also, it will be noted that under any stable condition of $h$ when $P_B<P_C$, the spacing $h$ for any given $P_S$ also increases with the value of radius $r$. For example, with $T=0.80$ and $P_S=0.36$ p.s.i.g., the value of $h$ is 20 microinches for $r=0.00005$ in., 40 microinches for $r=0.0022$ in., and 50 microinches for $r=0.0123$ in. Thus the dependence of $h$ on the edge radius $r$ is clearly demonstrated. The extent to which $r$ may be increased, with advantage, is not limited even by the radius R. However it will be noted that each increase in the value of $r$ brings a comparatively smaller increase in the range of stable $h$. For practical purposes, within the range of operating parameters used in the illustrated apparatus, it has been determined that sufficient benefit is derived when $r$ is equal to 0.001 R. In other words, satisfactory efficiency and flexibility of operation requires that $r$ be not less than about 0.001 R. However, other minimum values may be appropriate for structures of different parameters.

It will be noted from an inspection of FIGURES 9–11 that, with a sufficient radius $r$, stable values of $h$ may be obtained with flow of air in either direction between the groove and pressure source. Following the curve $P_S=0.72$ p.s.i.g. in FIGURE 11, for example, it will be seen that when $P_B=P_C$, the value of $P_S=0.72$ p.s.i.g. is substantially greater than the value of $P_B=P_C=T/R=0.55$ p.s.i.g., so that clearly there is air flow from the pressure source into the groove and bearing under these circumstances, although the bearing is stable. At the extreme end of the curve $P_S=0.72$ p.s.i.g., where $P_C=T/R=1.09$, $P_B$ is at some intermediate value and the air flow is out of the bearing and toward the pressure source, the bearing still being stable. Generally speaking, when there is zero flow between the groove and pressure source, the film thickness in region C is the same as the film thickness in region 21 (FIGURE 1), or in other words the same as that of a self-acting bearing with no pressure source 22 or groove 18. When there is flow of air from the groove toward the pressure source, the film thickness in region C is less than that of the simple self-acting bearing of region 21. When there is flow from the pressure source toward the groove, the film thickness in region C is greater than that of the simple self-acting bearing of region 21. In the latter case the film thickness may be either stable or unstable, depending upon whether $P_B$ is greater than $P_C$ (unstable) or is equal to or less than $P_C$ (stable). One advantageous effect of increasing the edge radius $r$ is to increase the range of stable film thicknesses $h$ in region C that are greater than the film thicknesses of the simple self-acting bearing of region 21.

Figure 12:
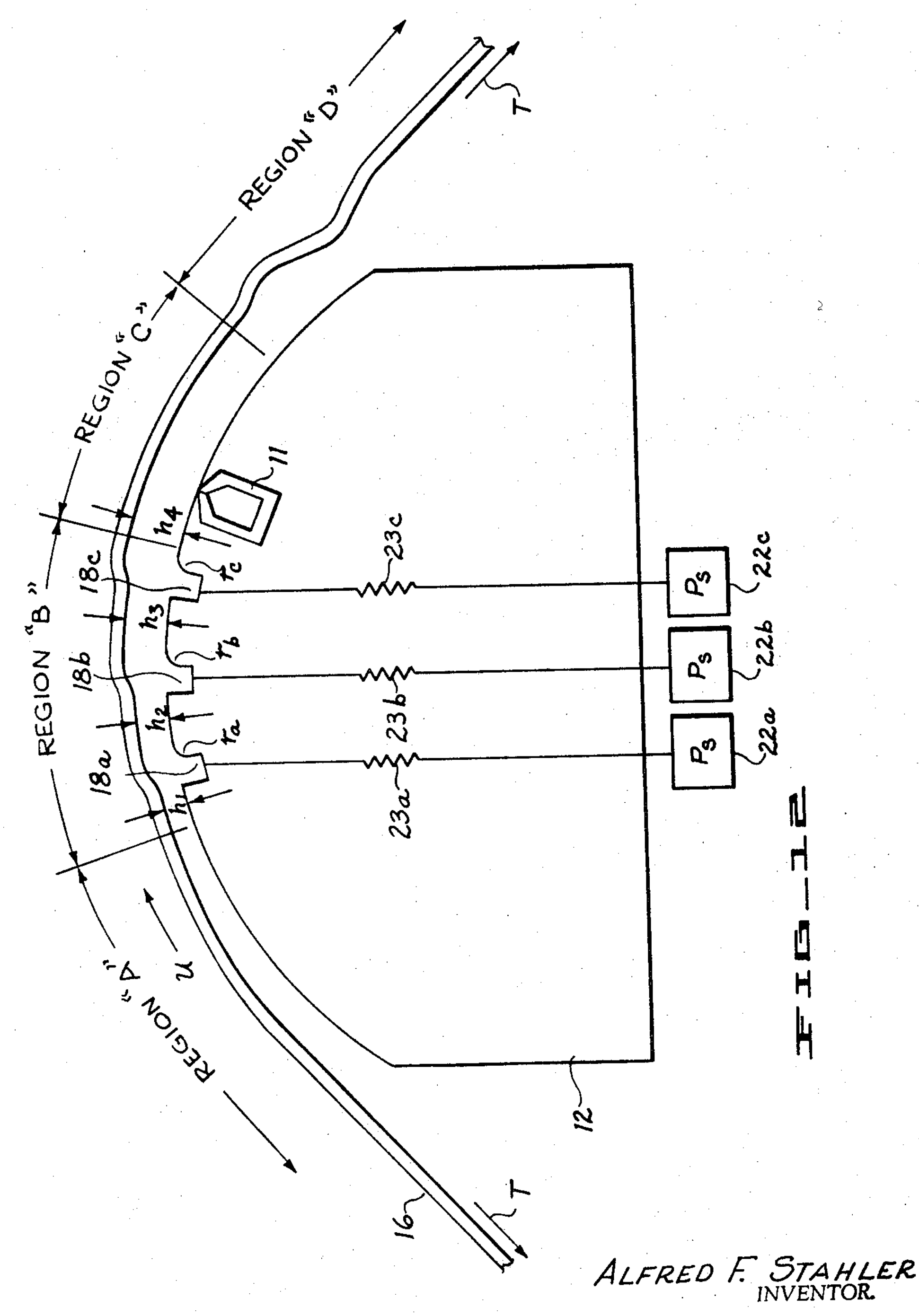
FIGURE 12 is a schematic view of a bearing constructed in accordance with the invention.

If it is desired to produce a stable film thickness $h$ that is very much greater than the simple self-acting film thickness, a series of grooves and pressure sources may be cascaded as shown in FIGURE 12. In this example, Region B contains three grooves 18$a$, 18$b$ and 18$c$, each coupled through a corresponding restrictor 23$a$, 23$b$, 23$c$, to a corresponding pressure source 22$a$, 22$b$ and 22$c$. Each groove has a downstream edge radius $r_a$, $r_b$ and $r_c$, respectively, that is sufficiently great to produce a zone on the performance chart in which there is some flow of air from the corresponding pressure source into the groove when $P_B$ in the groove is equal to or less than $P_C$ beneath the tape immediately downstream from the groove. Each pressure source is set to produce the maximum flow, or nearly the maximum, with $P_B$ equal to or only slightly less than the corresponding $P_C$. Thus, if the simple self-acting film thickness is $h_1$, the groove 18$a$ produces a stable downstream film thickness $h_2>h_1$; groove 18$b$ produces a stable downstream film thickness $h_3>h_2$; and groove 18$c$ produces a stable downstream film thickness $h_4>h_3$. The pressure sources 22$a$, 22$b$ and 22$c$ may be replaced by a single source if only one supply pressure $P_S$ is to be used at all of the grooves.

Figure 13:
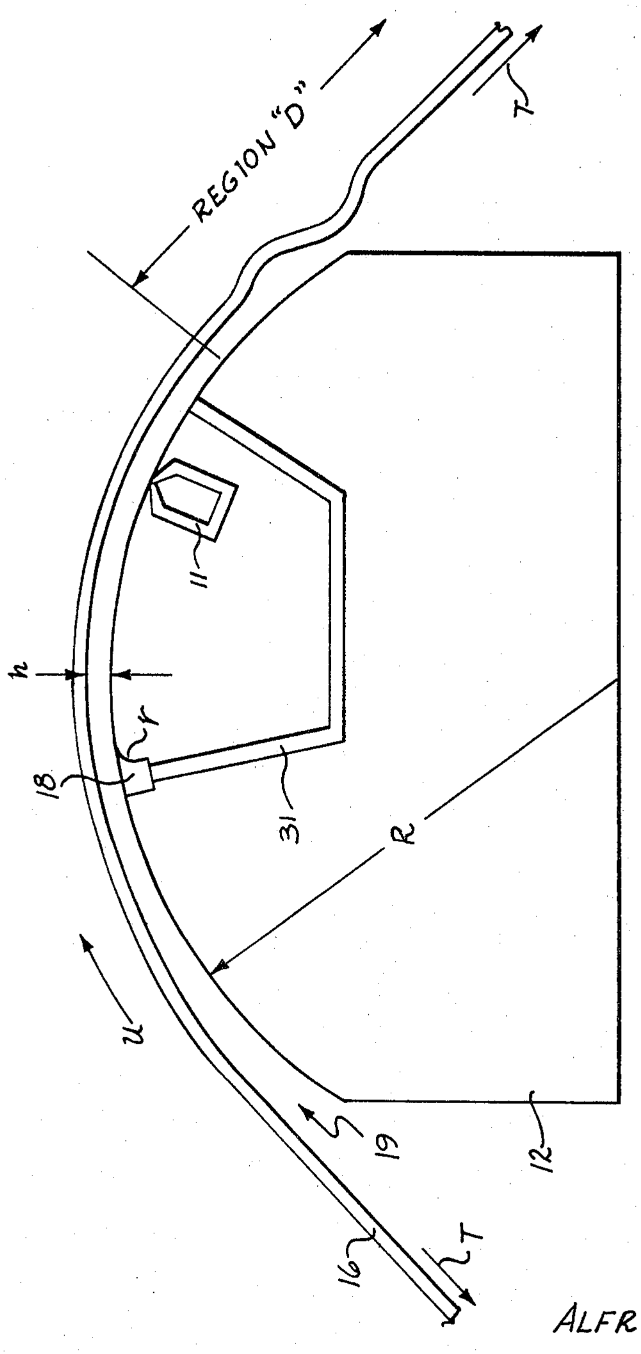
FIGURE 13 is a schematic view of a bearing constructed in accordance with the invention.

The pressure source that is used may take any of a number of forms. For some purposes it may be represented by the ambient atmosphere as previously noted. In FIGURE 13 an arrangement is shown in which the pressure $P_S$ is provided by the film itself downstream from the groove, as by means of a communicating passage 31.

Thus $P_S=P_C$. However, the value of $P_B$ is still a function of the edge radius $r$, and decreases as the radius $r$ increases, so that air flow takes place in the passage 31 toward the groove. This flow feeds the bearing and increases the film thickness $h$ downstream from the groove, with $h$ being greater than the simple self-acting film thickness upstream, for all values of $r>0$. In effect, the film downstream from the groove is made up of a first air flow extending from the entrance region 10 to the exit region D, plus a second circulating air flow from the groove to the downstream opening of passage 31, and back through the passage 31 to the groove.

Figure 14:
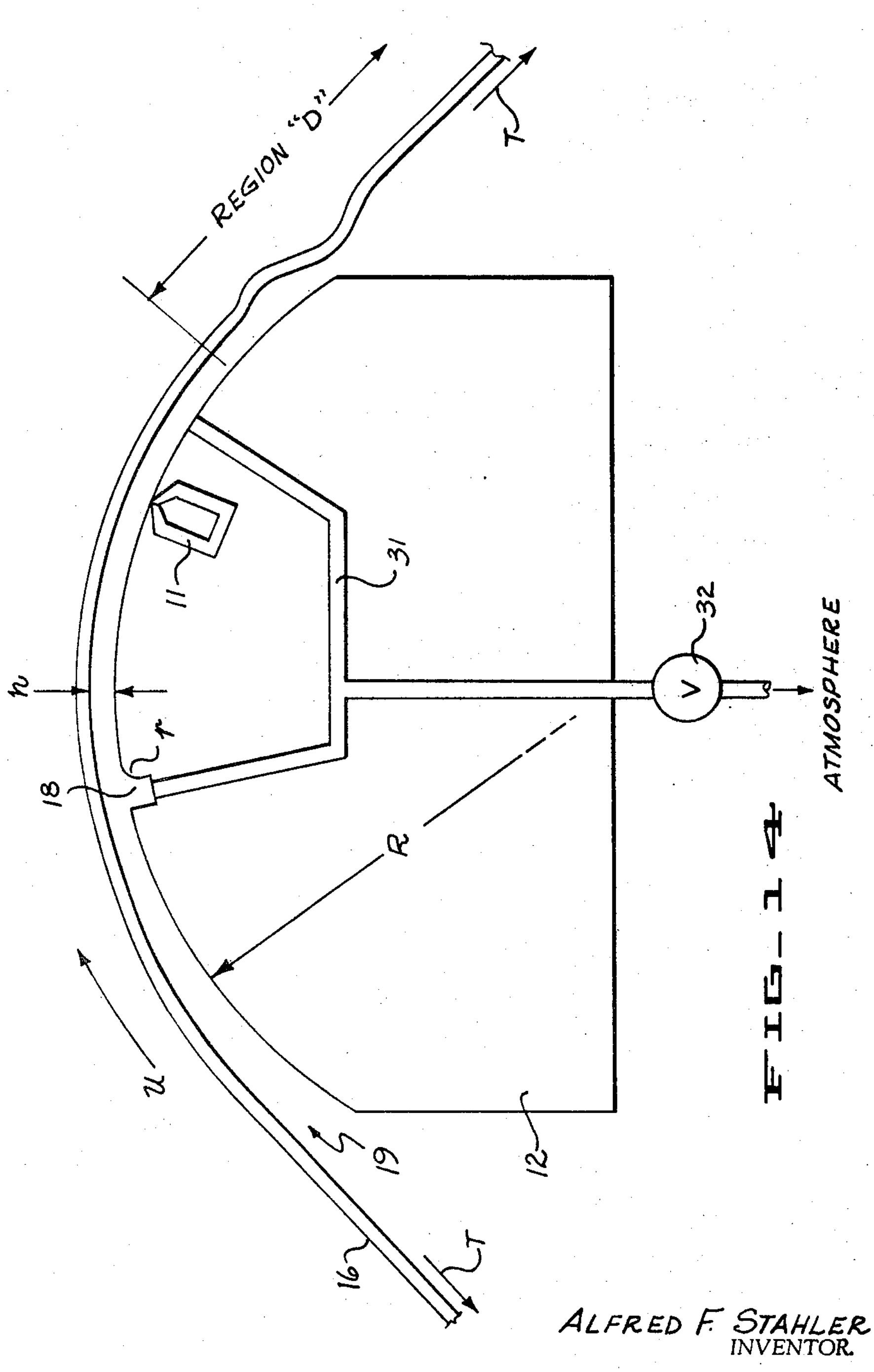
FIGURE 14 is a schematic view of a bearing constructed in accordance with the invention.

FIGURE 14 shows a bearing similar to that of FIGURE 13, but also including a variable restrictor or valve 32 for operational bleeding to decrease and to thus control the film thickness $h$.

Figure 15:
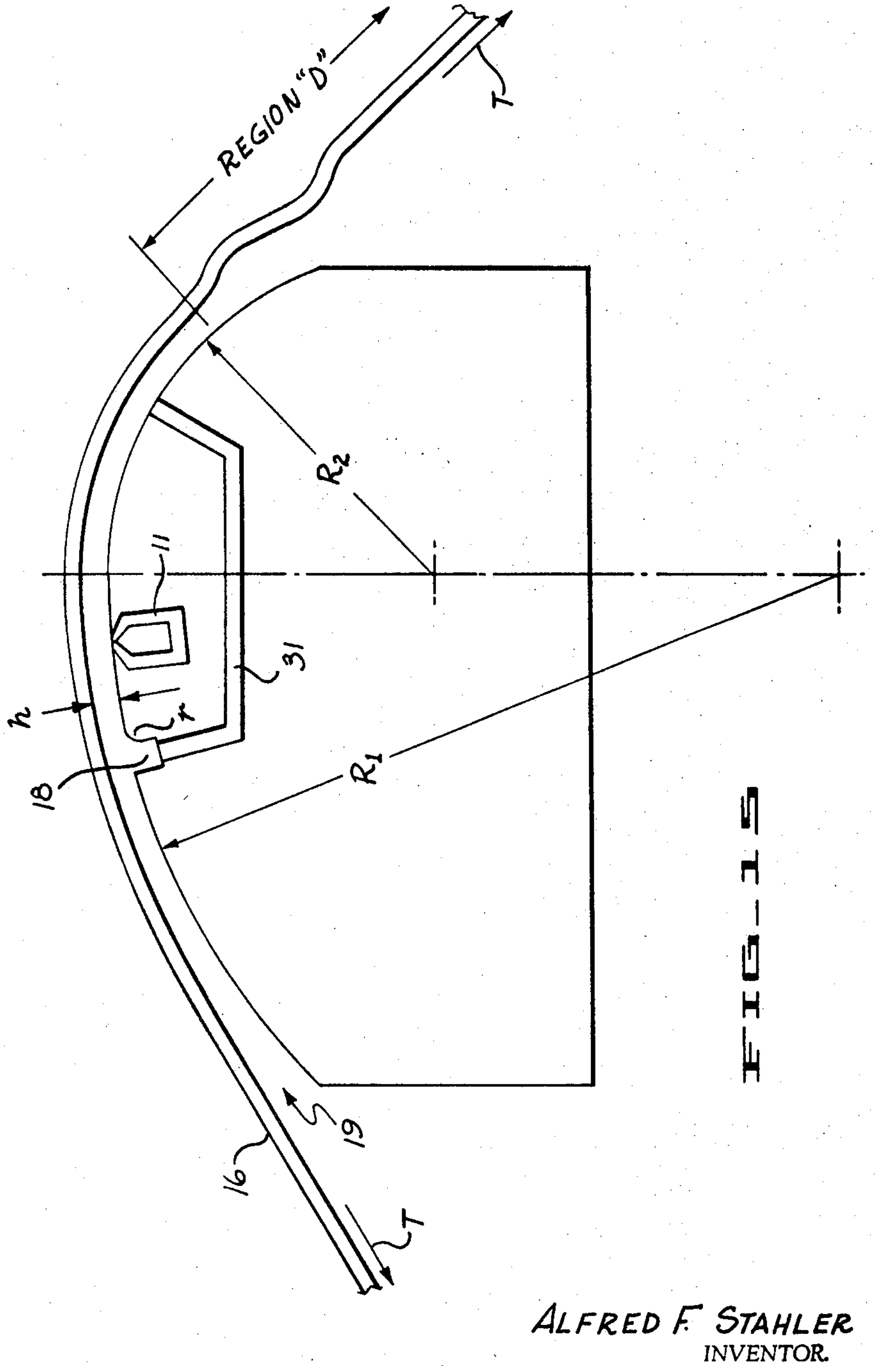
FIGURE 15 is a schematic view of a bearing constructed in accordance with the invention.
Figure 1E:
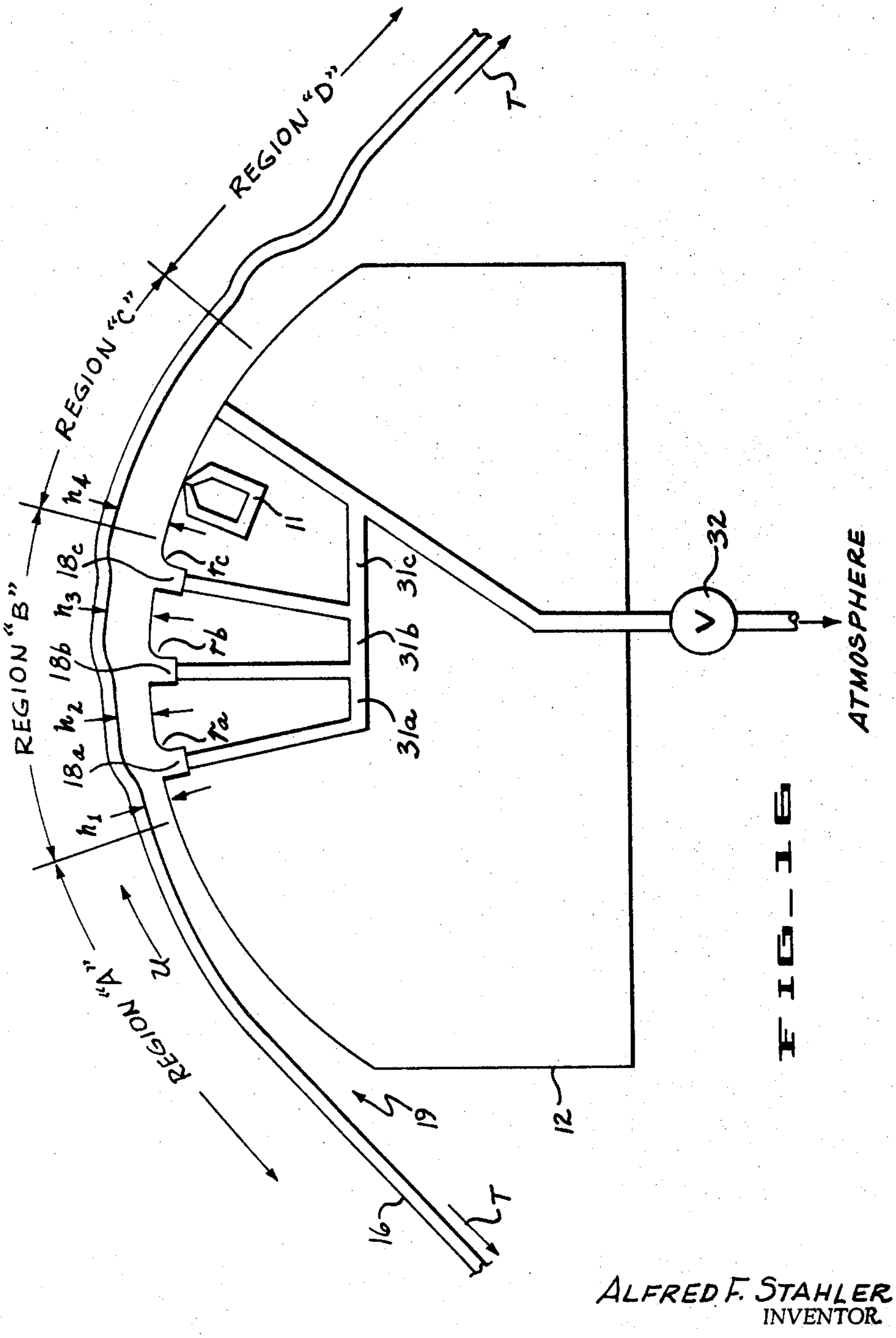
Figure 12:
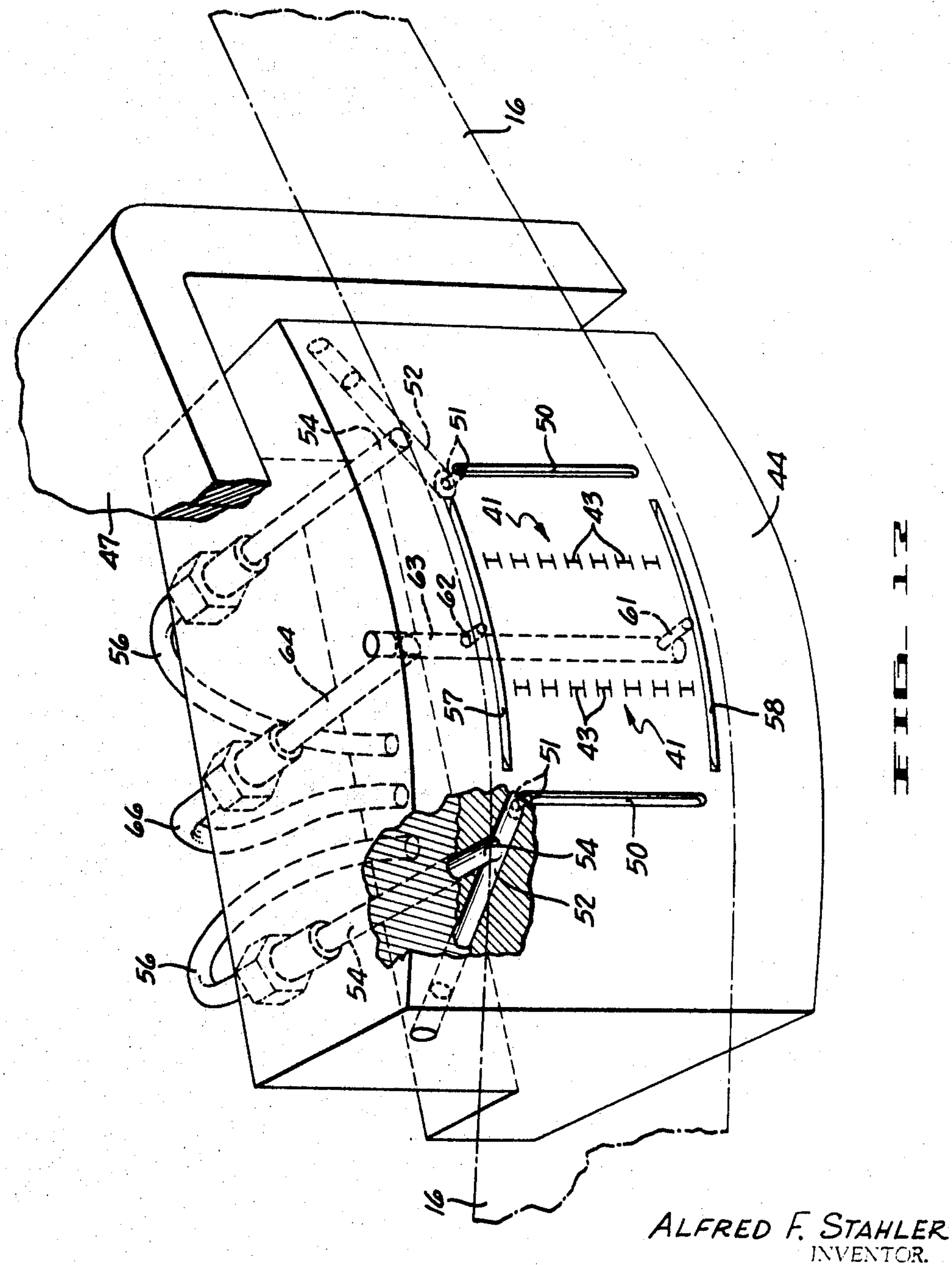
Figure 18:
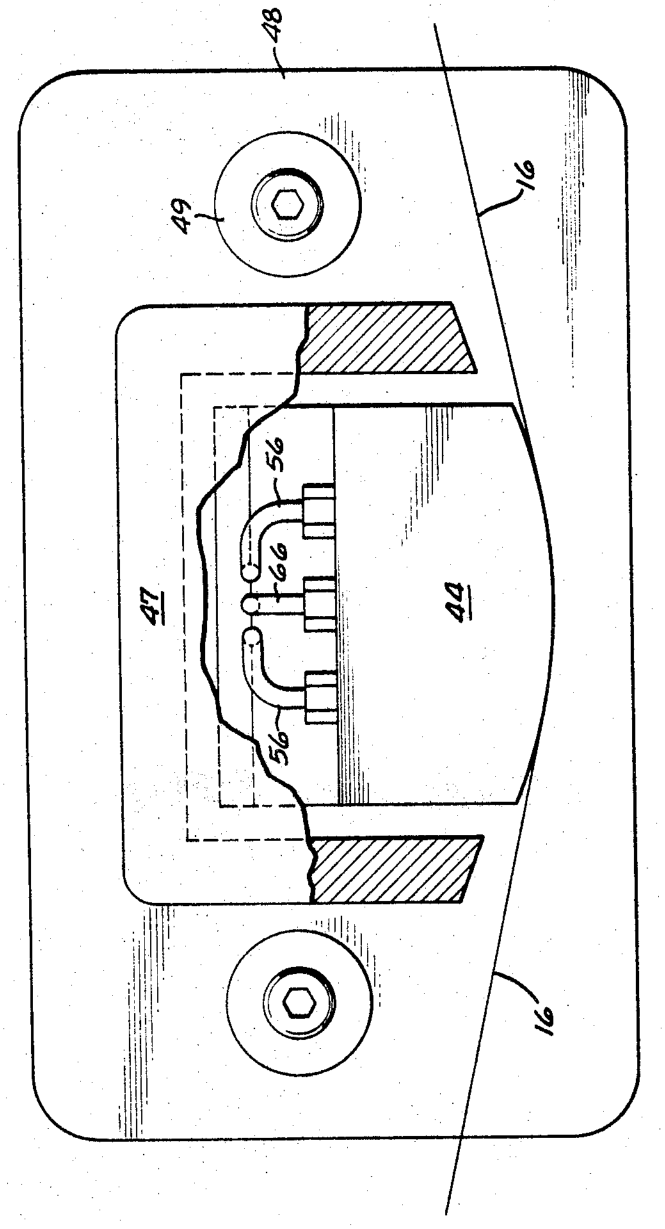
FIGURE 18 is a plan view of the bearing of FIGURE 17.
Figure 19:
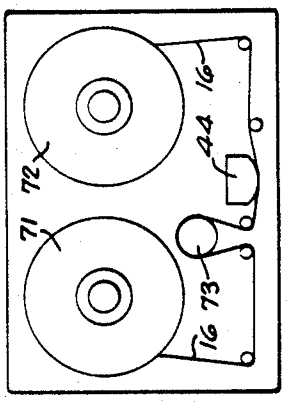
FIGURE 19 is a plan to a reduced scale of a magnetic tape transport incorporating the bearing of FIGURES 17, 18.

FIGURE 15 shows an arrangement in which the passage 31 communicates with a portion of the bearing having a radius $R_2$ that is less than the radius $R_1$ at the region of the groove. The effect of this arrangement is to greatly increase the film thickness $h$, but unstably, for the pressure $P_S$ from the zone of $R_2$ is substantially greater than the pressure $P_C$ from the zone of $R_1$, so that $P_B>P_C$ immediately downstream from the groove.

FIGURE 16 shows a cascaded arrangement of three grooves 18$a$, 18$b$ and 18$c$, each located in a bearing block section of different radius $R_a>R_b>R_c$, and each groove fed by a corresponding passage 31$a$, 31$b$ and 31$c$ opening at a point downstream from the groove. In the illustrated device, the passages are all combined into a single passage having branches to the respective grooves.

In the apparatus of FIGURE 16, as in the apparatus previously described, the respective edge radii $r_a$, $r_b$ and $r_c$ determine the respective film thicknesses $$h_1<h_2<h_3<h_4$$

Furthermore, each of the film thicknesses is stable, as in the apparatus of FIGURE 13. In the apparatus of FIGURE 16, a bleeder valve 32 may be coupled to the passage 31$c$ for adjustable control of the film thickness $h_4$ at head 11. With such an apparatus any desired film thickness may be obtained at any speed and tension, without the use of separate pressure sources.

An actual transducing apparatus built and operated in accordance with the invention is shown in FIGURES 12–14. The transducer has two head stacks 41 and 42, each including seven heads 43 for use on seven tracks of the tape 16. The heads are mounted in a block 44 having a curved face 46, and the block is mounted within a shield 47, the whole being mounted on a base plate 48, which is mounted on the top plate of a transport by means of bolts 49. In the use intended, the tape is operated for recording and reproducing in both forward and reverse directions. Accordingly, two grooves 50 are provided transverse to the direction of movement, so that in either direction, one of the grooves 50 is upstream from the heads 43. In either direction, the downstream groove has no effect on the air film thickness at the heads 43. The grooves 50 are each fed by respective interior channels 51, 52 (one end of which is sealed by a plug 53) and 54, and by exterior conduits 56, which communicate with appropriate restrictors and a pressure source, not shown. A pair of edge grooves 57, 58 are also provided for compensating for lateral leakage of air from the edges of the tape, as disclosed in said concurrently filed application by Joseph T. Ma, et al. The edge grooves 57, 58 are fed pressurized air by interior channels 61, 62, 63 and 64, and by an exterior conduit 66 communicating with an appropriate restrictor and pressure source, not shown. The grooves 50 and 57, 58 in this example are approximately 6 mils wide. FIGURE 14 shows the mounting of the apparatus in a magnetic tape transport, including reels 71, 72 and a capstan and pinch roller assembly 73 by which the tape is tensioned in a manner known in the art.

While the invention has been described in relation to a bearing force moving foil and stationary rigid bearing member, it will be understood that the principles herein disclosed may equally well be applied to a bearing in which the foil is stationary and the rigid bearing member is moving, such as for example, a foil bearing for a rotating shaft. It will also be understood that fluids other than air may be used, and that the recesses 18 may be variously formed, and may for example be defined by a reentrant or concave portion of the surface 14, together with a pair of flanges extending from the block 12 and closely bracketing the tape edges.

Thus there has been described a bearing having a transverse groove opening in the bearing surface at a point upstream from the transducer head gap in relation to the direction of tape motion, and a pressure source coupled to the groove for controlling the flow of air beneath the tape at the groove.

The shape of the groove and the value of the air pressure in the source control the thickness of the air film beneath the tape and the spacing of the tape from the head. Stability of this spacing is obtained when the pressure source is adjusted to a value at which the pressure in the groove is equal to or less than the pressure beneath the tape at the head.

What is claimed is:

1. In a magnetic tape transducing apparatus of the type in which said tape is tensioned around the curved surface of a head having a magnetic transducing gap inset therein and said tape is spaced from said surface by a fluid film flowing in an upstream-to-downstream direction, the combination comprising:

means for controlling the flow of said fluid in said film at a zone upstream from said gap and for thereby maintaining said film and controlling the thickness of said film in the vicinity of said gap; and said control means including means for causing the pressure in said film at said zone upstream from said gap to be equal to or less than the pressure in said film at said gap, whereby said film thickness at said gap is stably maintained.

2. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, a variable restrictor coupled to said recess, a pressurized air source coupled to said restrictor and cooperating therewith to control the flow of said air upstream from said transducing gap to maintain said film and control the thickness of said film at said gap, the improvement comprising:

said pressurized air source and said restrictor being arranged to provide air at a pressure such that the pressure in said film at said recess falls in a range extending from zero gauge pressure to and including the pressure in said film at said gap, said pressurized air source being constituted by the ambient atmosphere.

3. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and a pressurized air source coupled to said recess and cooperating therewith to control the flow of said air upstream from said transducing gap to maintain said film and control the thickness of said film at said gap, the improvement comprising:

said pressurized air source being arranged to provide air at a pressure such that the pressure in said film at said recess falls ina range extending from zero gauge pressure to and including the pressure in said film at said gap; and the downstream side of said recess having a substantial slope converging toward said tape in said downstream direction.

4. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and a pressurized air source coupled to said recess and cooperating therewith to control the flow of said air upstream from said transducing gap to maintain said film and control the thickness of said film at said gap, the improvement comprising:

said pressurized air source being arranged to provide air at a pressure such that the pressure in said film at said recess falls in a range extending from zero gauge pressure to and including the pressure in said film at said gap; and the downstream side of said recess having a substantial slope converging toward said tape in said downstream direction, with said film thickness being a function of the shape of said slope, said shape being that of a cylindrical surface the generatrices of which are transverse to the direction of motion of said tape.

5. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and a pressurized air source coupled to said recess and cooperating therewith to control the flow of said air upstream from said transducing gap to maintain said film and control the thickness of said film at said gap, the improvement comprising:

said pressurized air source being arranged to provide air at a pressure such that the pressure in said film at said recess falls in a range extending from zero gauge pressure to and including the pressure in said film at said gap; and the downstream side of said recess having a substantial slope converging toward said tape in said downstream direction, with said film thickness being a function of the shape of said slope, said shape being that of a right circular cylindrical surface the generatrices of which are transverse to the direction of motion of said tape, and the axis of which is downstream from said recess and beneath said curved face, the radius of curvature of said cylindrical surface being greater than one-thousandth the radius of curvature of said cylindrical face of said bearing member.

6. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, the combination comprising:

a plurality of recesses formed in said head upstream from said gap and spaced apart in said upstream-downstream direction; and at least one pressurized air source coupled to said recesses and cooperating therewith to establish a corresponding plurality of regions of constant film thickness each downstream from one of said recesses and upstream from the recess that is next downstream;

said pressurized air source being arranged to provide air at a pressure such that the pressure in said film at each of said recesses falls in a range extending from zero gauge pressure to and including the pressure in said film at the corresponding next downstream region of constant film thickness, whereby said film thickness at said head is stably maintained.

7. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to control the flow of said air upstream from said transducing gap to control the thickness of said film at said gap, the improvement comprising:

said pressurized air source being constituted by said film in the region of said gap, as by means of a passageway formed in said head and communicating with said recess and opening on said surface in said gap region, whereby the pressure in said film at said recess is caused to fall in a range extending from zero gauge pressure to and including the pressure in said film at said gap.

8. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to control the flow of said air upstream from said transducing gap to maintain said film and control the thickness of said film at said gap, the improvement comprising:

the downstream side of said recess having a substantial slope converging toward said tape in said downstream direction;

said pressurized air source being constituted by said film in the region of said gap, as by means of a passageway formed in said head and communicating with said recess and opening on said surface in said gap region, whereby the pressure in said film at said recess is caused to fall in a range extending from zero gauge pressure to and including the pressure in said film at said gap; and a variable restrictor coupled to said passageway and operable to vent said passage selectively to atmosphere for selecting said pressure in said film at said recess.

9. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, the combination comprising:

a plurality of recesses formed in said head upstream from said gap and spaced apart in said upstream-downstream direction; and at least one passageway formed in said head and communicating with said recesses and opening on said surface downstream therefrom to establish a corresponding plurality of regions of constant film thickness each downstream from one of said recesses and upstream from the recess that is next downstream;

whereby said passageway provides air at a pressure such that the pressure in said film at each of said recesses falls in a range extending from zero gauge pressure to and including the pressure in said film at the corresponding next downstream region of constant film thickness, so that said film thickness at said head is stably maintained.

10. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, the combination comprising:

a plurality of recesses formed in said head upstream from said gap and spaced apart in said upstream-downstream direction, the downstream side of each of said recesses having a substantial slope converging toward said tape in said downstream direction;

at least one passageway formed in said head and communicating with said recesses and opening on said surface downstream therefrom to establish a corresponding plurality of regions of constant film thickness each downstream from one of said recesses and upstream from the recess that is next downstream; and a variable restrictor coupled to said passageway and operable to controllably vent said passageway and recesses to atmosphere;

whereby said pasageway provides air at a pressure such that the pressure in said film at each of said recesses is variable to fall in a range extending from zero gauge pressure to and including the pressure in said film at the corresponding next downstream region of constant film thickness, so that said film thickness at said head is stably maintained.

11. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to control the flow of said air upstream from said transducing gap to maintain said film and control the thickness of said film at said gap, the improvement comprising:

said surface having a radius of curvature in the vicinity of said gap that is susbtantially less than the radius of curvature of said surface in the region of said recess; and said pressurized air source being constituted by said film in the region of said gap, as by means of a passageway formed in said head and communicating with said recess and opening on said surface in said gap region.

References Cited

UNITED STATES PATENTS

| | | | |
|---|---|---|---|
| 3,151,796 | 10/1964 | Lipschutz ---------- | 179—100.2 |
| 3,170,045 | 2/1965 | Baumeister et al. --- | 179—100.2 |
| 3,219,990 | 11/1965 | Goehle ------------ | 340—174.1 |
| 3,273,896 | 9/1966 | Maeder ------------ | 179—100.2 |
| 3,319,238 | 5/1967 | Jacoby ------------ | 340—174.1 |

BERNARD KONICK, *Primary Examiner.*

V. P. CANNEY, *Assistant Examiner.*

U.S. Cl. X.R.

226—95; 179—100.2